(12) United States Patent
Lee et al.

(10) Patent No.: US 11,421,649 B2
(45) Date of Patent: Aug. 23, 2022

(54) HORIZONTAL AND VERTICAL AXIS WIND GENERATOR

(71) Applicants: Jung Dae Lee, Wheaton, IL (US); Jung Hoon Lee, Wheaton, IL (US)

(72) Inventors: Jung Dae Lee, Wheaton, IL (US); Jung Hoon Lee, Wheaton, IL (US)

( * ) Notice: Subject to any disclaimer, the term of this patent is extended or adjusted under 35 U.S.C. 154(b) by 0 days.

(21) Appl. No.: 14/499,132

(22) Filed: Sep. 27, 2014

(65) Prior Publication Data
US 2016/0108887 A1    Apr. 21, 2016

(51) Int. Cl.
*F03D 3/00* (2006.01)
*F03D 3/02* (2006.01)
*F03D 1/02* (2006.01)
*F03D 9/25* (2016.01)
*F03D 15/10* (2016.01)

(52) U.S. Cl.
CPC .............. *F03D 3/005* (2013.01); *F03D 1/02* (2013.01); *F03D 3/002* (2013.01); *F03D 3/02* (2013.01); *F03D 9/25* (2016.05); *F03D 15/10* (2016.05); *Y02B 10/30* (2013.01); *Y02E 10/74* (2013.01)

(58) Field of Classification Search
CPC ........ F03D 3/002; F03D 3/005; F03D 3/0445; F03D 3/02; F03D 9/002; F03D 9/28; F03D 15/10; Y02E 10/30; Y02E 10/74
See application file for complete search history.

(56) References Cited

U.S. PATENT DOCUMENTS

| 4,433,544 A | * | 2/1984 | Wells ...................... F03D 9/007 290/55 |
| 8,128,337 B2 | * | 3/2012 | Pezaris ..................... F03D 3/02 415/191 |
| 2012/0074706 A1 | * | 3/2012 | Lynn ......................... F03D 3/02 290/55 |
| 2016/0079829 A1 | * | 3/2016 | Vera .......................... F03D 1/04 290/52 |

FOREIGN PATENT DOCUMENTS

WO    WO 2009043119 A1 *   4/2009   ............... F01D 1/26
WO    WO 2013159113 A1 * 10/2013   ............. F03D 9/002

* cited by examiner

*Primary Examiner* — J. Todd Newton, Esq.
*Assistant Examiner* — Jesse M Prager
(74) *Attorney, Agent, or Firm* — Sang Ki Lee; Law Offices of Sang Lee

(57) ABSTRACT

An embodiment of Horizontal and Vertical Axis Wind Generator (HVAWG) concept with the rotating wings, the gearbox, repulsive magnets attached to the wings and the wind tunnel cover with the same pole magnets or repulsive magnets is described. This feature allows for a number of improvements over the current state of the art including damage protection and the ability to remain operational during high wind conditions. In addition, the invention described here is scalable for cars, boats, motor cycles, camping cars, homes, offices, and power plants.

7 Claims, 6 Drawing Sheets

HORIZONTAL AND VERTICAL AXIS WIND GENERATOR

STATEMENT REGARDING FEDERALLY SPONSORED RESEARCH OR DEVELOPMENT

Not Applicable

FIELD

The present invention relates to a wind generator, more specifically, a wind generator with the horizontal axis and the vertical axis that include wings, repulsive magnets, gearbox, and the wind tunnel cover.

BACKGROUND

Wind energy does not pollute the air like power plants that rely on combustion of fossil fuels, such as coal or natural gas. Also, wind turbines do not produce atmospheric emissions that cause acid rain or greenhouse gasses. Finally, mobile cars or mobile homes which use wind energy do not need charging stations for recharging the energy. Wind generator is the most popular way of harvesting wind energy.

Wind turbines or generators are categorized as Horizontal-axis Wind Turbine (HAWT) and Vertical-axis Wind Turbines (VAWT). Researchers Erikson, Bernhoff and Leijon compared VAWT and HAWT designs in their article titled "Evaluation of different turbine concepts for wind power" which was published in 2008 in Renewable & Sustainable Energy Review issue 12. According to this article, HAWT design which most commercial wind farms utilize are considered complicated due to yaw mechanism which orients the turbine toward the wind and pitch mechanism that regulates the speed of the propeller. The article also mentions that HAWT designs are hard to maintain due to the fact that generator assembly is placed high above the ground. These mechanisms complicate the HAWT design and makes maintenance difficult due to the fact that all these mechanisms are placed high above the ground. The article also mentions that HAWT designs have almost reached their maximum possible size for megawatt level applications due to cyclically reversing gravitational loads on their blades.

Vertical-axis Wind Turbines (VAWT) may seem simpler in terms of structure due to the fact that they do not require to be oriented toward the wind. According to Erikson et al., this omni-directional nature of the turbine makes it very attractive for locations where wind frequently changes its direction. However, VAWT design has also has its own complications. Theoretically the efficiency of VAWT design is less than the efficiency of HAWT design due to the active area of the turbine which faces the wind. The theoretical maximum power coefficient of wind turbines is called Betz limit and found to be Cp=0.59. For HAWT designs this factor of performance is between 0.40 and 0.50. In case of VAWT designs this factor is found to be no more than 0.40 [Erikson et al.] Another factor of VAWT design that negatively affects the efficiency is the fact that while one of the vanes of VAWT is exposed to wind and converting the wind energy, another vane is being moved against the wind to continue the rotation of the turbine.

Despite all these negative points, mechanical simplicity of VAWT makes it very attractive for commercial wind farm applications. According to the literature, VAWT turbines can be packed denser than HAWT turbines since that cause less turbulence. However, there are still some difficulties that hinder the application of VAWT designs in wind farm applications. Currently VAWT has three major obstacles which impede its commercial applicability. These are;

1. Storm protection. When wind speed reaches gale force level, there should be a mechanism to shut down the turbine and mechanically protect the structure and the vanes of the turbine from damage. This is not available with traditional VAWT designs like Savonius, Darrius and H-rotor design.
2. Speed regulation. There is a need for a speed control mechanism to regulate the rotational speed of the turbine so that power generated is less dependent on the wind speed.
3. Portable Size. There is a need for a smaller wind generator with enough capability for cars, boats, motor cycles, camping cars, homes, offices, and power plants.

These three problems are the main obstacles toward the commercialization of VAWT design. Recently there are attempts to solve these three problems. One of the most notable attempts is a patent filed by Sullivan with publication number US 2010/0172759 which uses airfoil shaped vanes and a mechanism for retracting vanes toward the rotational shaft on demand. The mentioned design is very similar to H-rotor design with retraction and storm protection capability added. Also, a patent filed by Ozkul with publication number WO 2011/141777 uses articulated vanes for VAWT design which can be raised or lowered automatically to regulate the angular speed of rotation of the turbine. Erikson et al. states in their mentioned research that VAWT design essentially operate in drag mode, which limits the speed of rotation and requires larger blade area than the HAWT designs. These trade-offs are acceptable as long as the cost of manufacture of blades are reduced. In addition, the traditional VAWT designs which require larger blades and big space can not be installed easily for cars, boats, motor cycles, camping cars, homes, and offices.

SUMMARY

The purpose of the invention is a modification of VAWT design which has storm protection capability as well as speed regulation capability. The invention uses the horizontal axis for VAWT design which can be rotated automatically to regulate the angular speed of rotation of the turbine. Even though the efficiency of VAWT design is theoretically lower than commercial HAWT's, these two features of the invention enable us to scale up the VAWT design which may make up for the lower efficiency. The articulated vanes of the turbine can be rotated in order to hunt for wind when wind speed is lower than expected. The design differs from US 2010/0172759 application by the use of fixed and repulsive magnets without retracting the vanes. Also, the design differs from WO 2011/141777 by the use of fixed and magnets without lifting or lowering the vanes.

The main feature of the design is its scalability for mega watt level applications. To achieve the above object, according to the present invention, one case of horizontal and vertical axis wind turbine generator is connected to the bottom of the generator and the first and second wings are radially extended from the horizontal axis, the third wings are radially extended from the vertical axis and the wind tunnel cover is connected to the third wings. The gearbox modules are mounted between the first wings and the second wings and the rotation of the first axis is regulated and passed to the second axis through the gearbox. The repulsive magnetic force between magnets in the second wings and magnets in the cover is added to the wind energy to move the wings using the magnetic energy of the same magnetic poles. In addition, the repulsive magnetic force between magnets in the third wings and magnets in the cover is added to the wind energy using the repulsive magnetic energy force of the same magnetic poles. The wind energy is passed to the vertical axis with the third wings through the wind tunnel cover.

BRIEF DESCRIPTION OF THE DRAWINGS

Various embodiments of the invention are disclosed in the following detailed description and accompanying drawings.

DETAILED DESCRIPTION OF THE INVENTION

Figure 1:
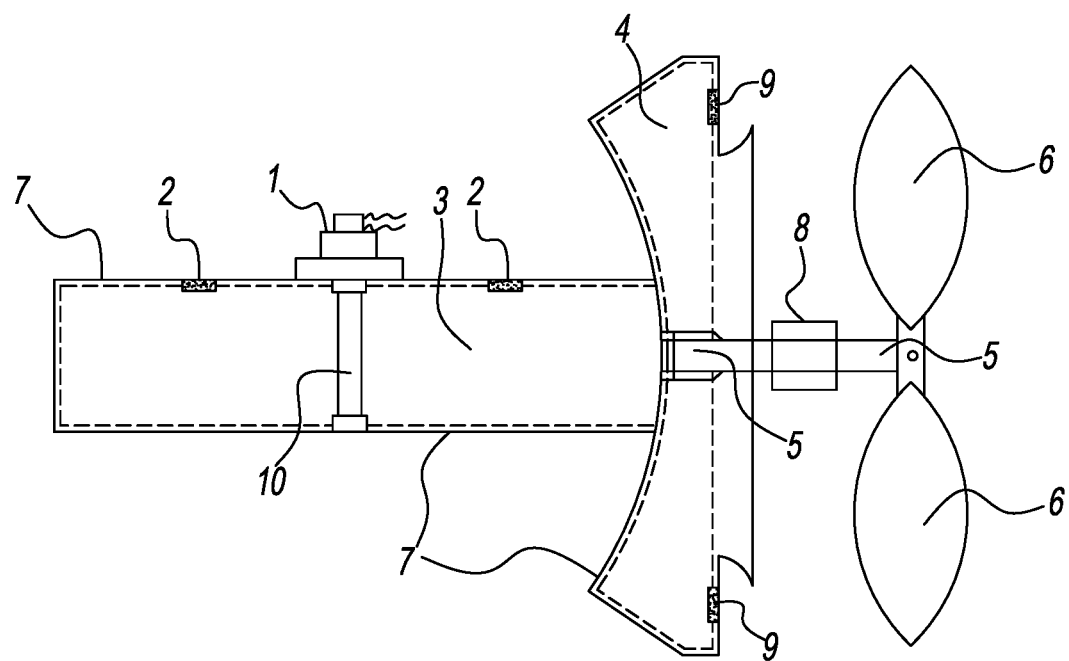
FIG. 1 is a side view of a horizontal and vertical axis wind generator in a tunnel according to the present invention.

The detailed description of the operation of the horizontal and vertical axis wind generator with vanes and magnets is explained in this section with reference to the accompanying drawings. According to FIG. 1, the horizontal and vertical axis wind generator according to the present invention, the generator motor (1) is connected to the vertical axle (10), the third wings (3) with repulsive magnets (2) are connected to the vertical axle (10) and the second wings (4) with repulsive magnets (9) are connected to the horizontal axle (5) and the first wings (6) are also connected to the horizontal axle (5) in a tunnel. The gearbox (8) changes revolutions per minute (RPM) of the first wings (6) and send the wind energy to the second wings (4). The gearbox (8) is depicted in detail on the right. The second wings (4) blow winds through the wind tunnel cover to the third wings (3). The third wings (3) rotate the vertical axle (10) and the axle (10) rotates the generator motor (1).

Figure 2:
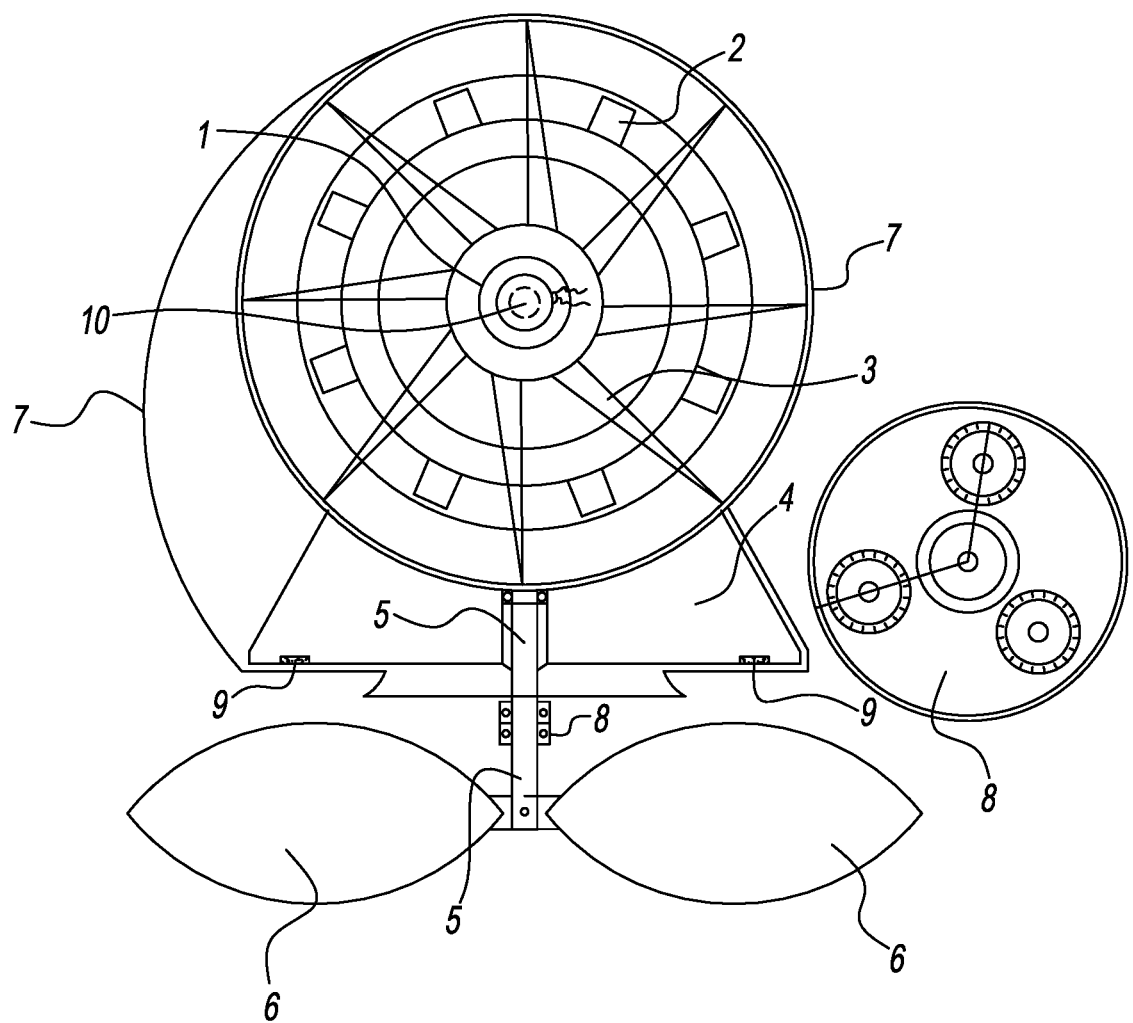
FIG. 2 is a top view (bird's eye view) of the horizontal and vertical axis wind generator to describe the relationship between the first and second wings and the horizontal axis with the gearbox.

Referring to FIG. 2, the horizontal and vertical axis wind generator according to the present invention operates as follows. The third wings (6) are always aligned in a straight line in the direction of the wind. Thus, if one assumes that the direction of the wind is the X-axis, the wings (6) are always aligned in the direction of the X axis and rotates around the axle (5). The wind blows to the wings (6) and wings (6) aligns in the direction of the wind and the wind energy from the first wings is passed to the second wings through the gearbox (8). The sectional view of the gearbox (8) is shown on the right side. When the wind blows the second wings (4) generate and pass the wind energy to the third wings through the wind tunnel cover (7). The repulsive magnets (9) in the second wings (4) and the repulsive magnets (2) in the third wings (3) is added to the wind energy using the magnetic energy of the same magnetic poles. For example, each magnet has a north pole and a south pole (named after the earth's magnetic north and south poles), and the north end of one magnet will stick to the south end of another magnet. Pushing two repulsive magnets together decreases the distance between them. This results in further increase in the repulsive force. Thus, if two north poles or two south poles are placed near each other in the second wings (2) and in the third wings (3), the magnets in the second wings (2) and the third wings (3) will push each other wings with the repulsive magnets away and would give additional push-away or repulsive force or energy to the existing wind energy.

Figure 3:
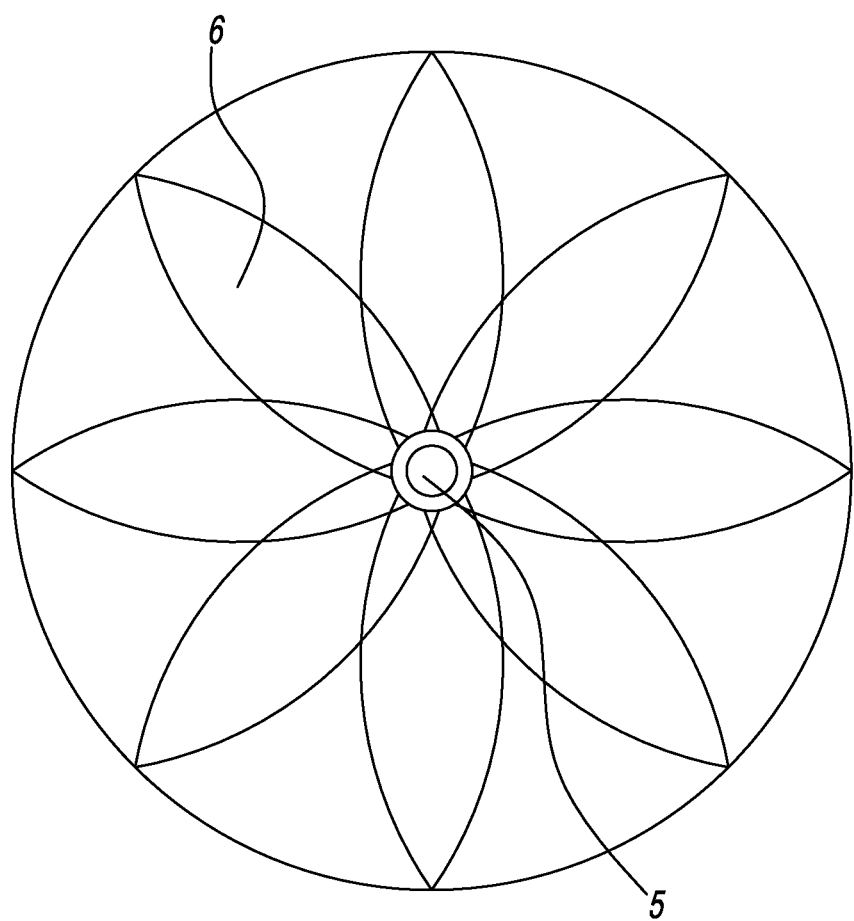
FIG. 3 is a front view of the horizontal and vertical axis wind generator to describe the relationship between the second wings with repulsive magnets and the horizontal axis.

Referring to FIG. 3, the first wings (6) are mounted to the connecting horizontal axle (5).

Figure 4:
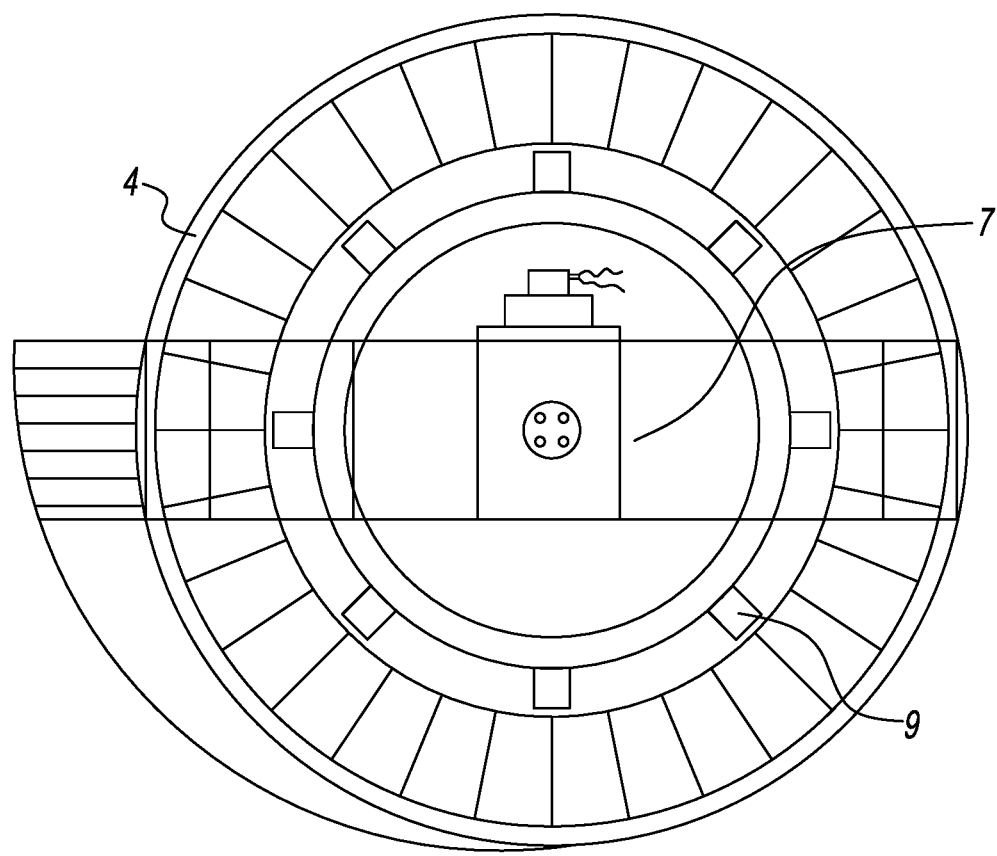
FIG. 4 is a cross-sectional view showing the second wings with magnets and the wind tunnel cover of the horizontal and vertical axis wind generator according to the present invention.

According to FIG. 4, the repulsive magnets (9) are attached to the second wings (4) and the wind tunnel cover (7) is mounted to the next of the second wings (4).

Figure 5:
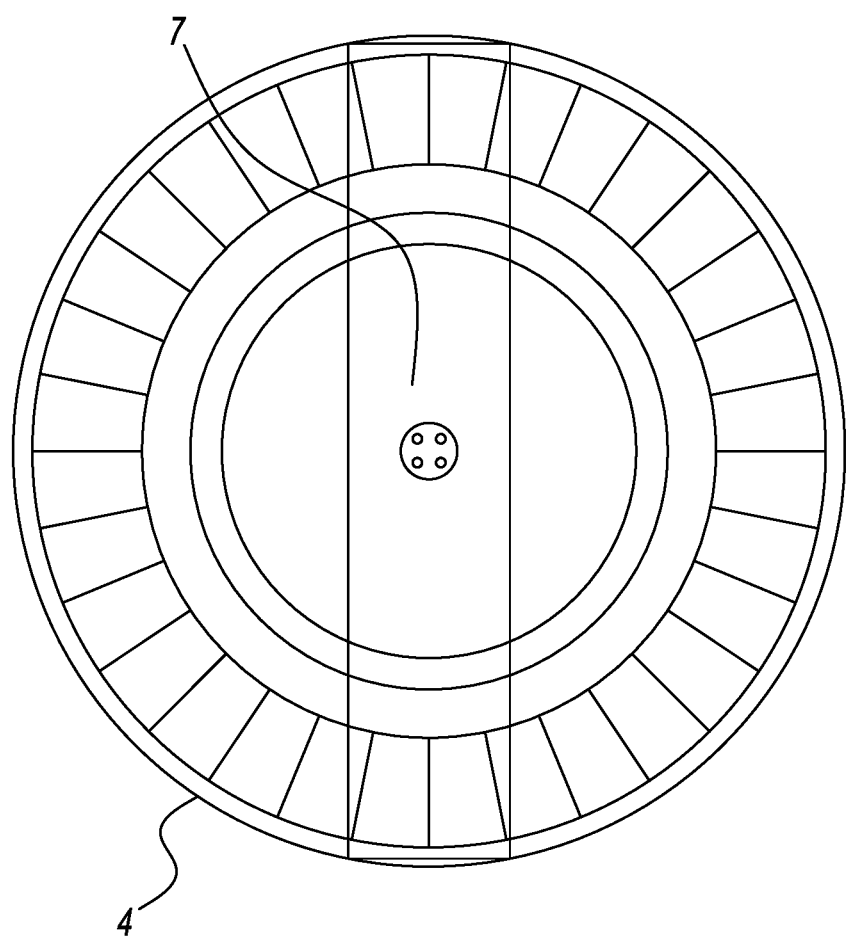
FIG. 5 is a cross-sectional view showing the second wings and the wind tunnel cover of the vertical axis wind generator according to the present invention.

According to FIG. 5, the wind tunnel cover (7) is mounted to the next of the second wings (4).

Figure 6:
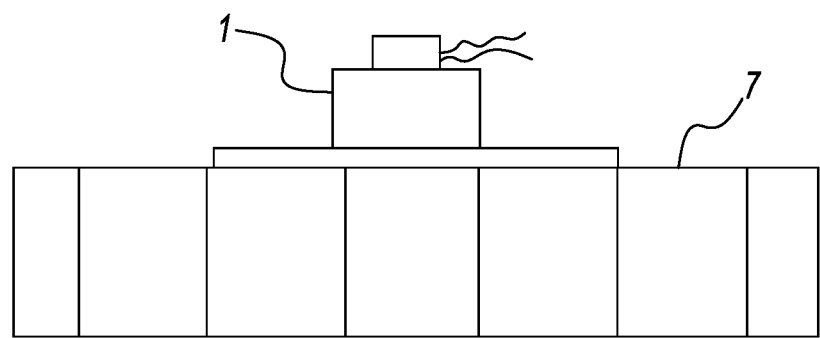
FIG. 6 is a sectional view showing the generation motor and the wind tunnel cover according to the present invention.

According to FIG. 6, the generation motor (1) is covered by the wind tunnel cover (7) according to the present invention.

The invention claimed is:

1. A horizontal and vertical axis wind generator comprising:
a horizontal axis turbine, the horizontal axis turbine comprising first wings, a gearbox, and a first horizontal axle coupled to the gearbox, wherein the first wings are attached to the first horizontal axle;
a horizontal axis fan, the horizontal axis fan comprising second wings, first repulsive magnets and a second horizontal axle coupled to the second wings, wherein the repulsive magnets are attached to the second wings, and the second horizontal axle is driven by the first horizontal axle via the gearbox; and
a vertical axis turbine, the vertical axis turbine comprising a vertical axle, third wings, and second repulsive magnets; and
a wind tunnel cover, the wind tunnel cover defining a tunnel;
wherein the second wings of the horizontal axis fan drive the vertical axle of the vertical axis turbine via a fluid connection in the tunnel and a repulsive force between the first repulsive magnets and the second repulsive magnets.

2. The horizontal and vertical axis wind generator of claim 1, wherein the third wings are attached to the vertical axle.

3. The horizontal and vertical axis wind generator of claim 1, wherein said second repulsive magnets are attached between the third wings of the vertical axis turbine.

4. The horizontal and vertical axis wind generator of claim 1, wherein the second wings of the horizontal axis fan send wind energy to the third wings of the vertical axis turbine through the wind tunnel cover.

5. The horizontal and vertical axis wind generator of claim 1, wherein a repulsive force between the second repulsive magnets attached to the third wings and the first repulsive magnets in the wind tunnel cover is between two same north or two same south magnetic poles.

6. The horizontal and vertical axis wind generator of claim 1, wherein said the vertical axle is connected to a generator motor.

7. The horizontal and vertical axis wind generator of claim 1, wherein the vertical axle is rotating and sends wind energy to a generator motor.

\* \* \* \* \*